US006116006A

United States Patent [19]
Killen et al.

[11] Patent Number: 6,116,006
[45] Date of Patent: Sep. 12, 2000

[54] HYDRAULIC SYSTEM FOR A DETACHABLE IMPLEMENT

[75] Inventors: Dale H. Killen, Port Byron; David Walter Kmoch, Geneseo, both of Ill.; Thomas G. Teller, Faribault, Minn.

[73] Assignee: Deere & Company, Moline, Ill.

[21] Appl. No.: 09/321,072

[22] Filed: May 27, 1999

[51] Int. Cl.[7] .................................................. A01D 69/00
[52] U.S. Cl. ............................... 56/11.9; 60/484; 60/468
[58] Field of Search ........................... 60/484, 468, 428; 56/10.9, 11.9, 10.8, 11.2, 11.1, DIG. 11, 10.2, 208, DIG. 15; 180/242

[56] References Cited

U.S. PATENT DOCUMENTS

| | | | |
|---|---|---|---|
| 3,643,407 | 2/1972 | Hubbard et al. | 56/10.2 |
| 3,738,763 | 6/1973 | Glesmann | 404/119 |
| 3,760,689 | 9/1973 | Johnston | 91/412 |
| 3,793,831 | 2/1974 | Khatti | 60/471 |
| 3,848,648 | 11/1974 | Dika et al. | 144/34 A |
| 4,058,139 | 11/1977 | Budzich | 137/596.13 |
| 4,095,545 | 6/1978 | Vaughn et al. | 114/26 |
| 4,140,196 | 2/1979 | Brewer | 180/44 F |
| 4,196,566 | 4/1980 | Donnelley | 56/8 |
| 4,220,184 | 9/1980 | Hallett et al. | 144/2 Z |
| 4,344,272 | 8/1982 | Gaudette et al. | 56/16.6 |
| 4,373,669 | 2/1983 | Swanson | 239/124 |
| 4,402,181 | 9/1983 | Acker et al. | 60/427 |
| 4,407,109 | 10/1983 | Swanson et al. | 56/11.9 |
| 4,541,229 | 9/1985 | Elijah | 56/10.2 |
| 5,088,532 | 2/1992 | Eggers et al. | 144/356 |
| 5,168,704 | 12/1992 | Kast et al. | 60/420 |
| 5,333,452 | 8/1994 | Dameron | 60/484 |
| 5,469,797 | 11/1995 | Hearne, Jr. | 111/200 |
| 5,477,882 | 12/1995 | Douthie | 137/567 |
| 5,497,604 | 3/1996 | Lonn | 56/10.2 H |
| 5,564,455 | 10/1996 | Keating et al. | 137/2 |
| 5,570,754 | 11/1996 | Stimson | 180/234 |
| 5,599,100 | 2/1997 | Jackson et al. | 366/152.5 |
| 5,600,952 | 2/1997 | Aquino | 60/421 |
| 5,615,553 | 4/1997 | Lourigan | 60/422 |
| 5,657,621 | 8/1997 | Mendes et al. | 56/16.4 D |
| 5,669,282 | 9/1997 | Tanino et al. | 91/520 |
| 5,746,677 | 5/1998 | Wakahara et al. | 477/35 |
| 5,809,779 | 9/1998 | Bruso | 60/458 |

*Primary Examiner*—Thomas B. Will
*Assistant Examiner*—Arpad Fabian Kovacs

[57] ABSTRACT

A hydraulic system for a detachable implement such as draper platform for a combine utilizes a platform-mounted pump supplied with return oil from the existing reel drive motor. The system utilizes the existing combine hydraulic connection for the reel drive to supply oil to the draper belt drive motors. Oil from the combine powers the reel drive motor and then flows into a manifold block (mixing chamber) before entering the inlet of the draper belt drive pump. This pump is sized to provide sufficient oil flow to power the draper belt drive motors, arranged in series. Return oil from the belt drive motors is routed back to the manifold block where it can mix with incoming oil from the reel drive pump before returning to the combine reservoir or being recirculated to the belt drive motors. The hydraulic system avoids the need to equip the platform with a complete hydraulic system and avoids the need to modify the existing hydraulic system of the combine.

20 Claims, 3 Drawing Sheets ized to provide sufficient oil flow to power the draper belt drive motors, arranged in series. Return oil from the belt drive motors is routed back to the manifold block where it can mix with incoming oil from the reel drive pump before returning to the combine reservoir or being recirculated to the belt drive motors.

HYDRAULIC SYSTEM FOR A DETACHABLE IMPLEMENT

BACKGROUND OF THE INVENTION

1. Field of the Invention

The present invention relates to a hydraulic system for a detachable implement having multiple hydraulic motors and in particular to a hydraulic system for a harvester header, such as a draper platform.

2. Description of Related Art

Draper platforms for harvesting machines, such as a combine, have a flat, wide belt, referred to as a draper or draper belt, to convey crop material. The arrangement and number of draper belts vary among platforms. One style of draper platform has two side belts that convey crop material laterally, to the center of the platform, where a center feed draper belt moves the crop material longitudinally into a combine feederhouse. Each of the draper belts is driven by a hydraulic drive motor.

In addition to the draper belts, a draper platform uses another hydraulic motor to rotate a reel above a cutterbar to hold crop material against the cutterbar and to move the cut crop material onto the draper belts. Hydraulic lift cylinders are used to raise and lower the reel as well as to position the reel fore and aft relative to the cutterbar.

A conventional combine includes a hydraulic system with connections for driving the platform reel and connections for operating the reel lift cylinders and the reel fore and aft adjustment cylinders. In addition to the hydraulic connections to the platform, the combine includes a power take off (PTO) for a mechanical power connection. The PTO is typically used to mechanically drive the platform cutterbar and crop conveying augers if the platform is so equipped.

Combines typically do not have additional hydraulic power connections for operating the draper belt drive motors. Therefore other provisions must be made for providing hydraulic power for this purpose. One option is to provide a complete hydraulic system on the platform including a gear pump that is driven by the combine PTO. This approach requires that the platform hydraulic system be equipped with a reservoir, filter and cooling package. This adds significant cost, weight and complexity to the draper platform. In addition, the PTO shaft speed is typically lower than required for efficient operation of a gear pump.

A second option is to provide additional pump capacity on the combine, thereby utilizing existing combine hydraulics to power the draper belt drive motors. A major disadvantage with this approach is the need for significant combine modifications in retrofit applications, as well as the need for another set of hydraulic hoses and couplers between a combine and the platform.

SUMMARY OF THE INVENTION

Accordingly, it is an object of the present invention to provide a hydraulic system for a detachable implement, such as a draper platform, that does not require modification to the existing combine hydraulic system and which does not require the added cost, weight and complexity of a complete hydraulic system onboard the platform.

The hydraulic system of the present invention utilizes a platform-mounted pump, supplied with return oil from the reel drive motor. The system utilizes the existing combine hydraulic connection for the reel drive. Oil from the combine powers the reel drive motor and then flows into a manifold block (mixing chamber) before entering the inlet of the draper belt drive pump. This pump is sized to provide sufficient oil flow to power the draper belt drive motors, arranged in series. Return oil from the belt drive motors is routed back to the manifold block where it can mix with incoming oil from the reel drive pump before returning to the combine reservoir or being recirculated to the belt drive motors.

At the upper end of the reel speed range, oil flow from the reel drive motor is sufficient to supply the needs of the belt drive pump, in which case all returning oil from the belt drive motors is immediately routed back to the combine. At the lower end of the reel speed range, oil from the reel drive motor may not be adequate to supply the entire demand of the belt drive pump, so a portion of the return oil from the belt drive motors will recirculate within the belt drive system, instead of immediately returning to the combine. The ports in the manifold block are configured such that the belt drive pump receives its priority oil from the reel drive motor return, and only draws its own return oil when necessary. The utilization of the oil from the reel drive motor as the priority oil together with the long oil flow path from the pump, through the motors and back to the manifold prevents excessive heat buildup in the belt drive hydraulic oil. The hydraulic system thus uses the belt drive pump to provide the desired oil flow from the reel drive circuit to drive the draper belt motors. No additional hydraulic connection to the combine is needed.

A unique aspect of the hydraulic system is the use of an Eaton T-Series Geroler motor as a pump. This motor was selected as the pump due to its low speed, high torque characteristics. In addition, this motor operates more efficiently at the low shaft speed available on the platform compared to gear pumps. Combine back pressure in the reel motor return will provide positive pump inlet pressure. The T-Series motor is not able to draw oil but combine back pressure provides this service. The T-Series motor was selected since the shaft seal can withstand back pressures up to 1500 psi. The high combine back pressure is not suitable for most gear pumps.

While the present invention has been developed for use with a draper platform for a combine, the hydraulic system of the present invention can be utilized in other applications where an implement is attached to a prime mover and utilizes two or more hydraulic drive motors, with one motor being driven by a connection to a hydraulic system on the prime mover. Other uses may include agricultural tractors and implements as well as construction equipment with detachable implements.

DESCRIPTION OF THE PREFERRED EMBODIMENT

Figure 1:
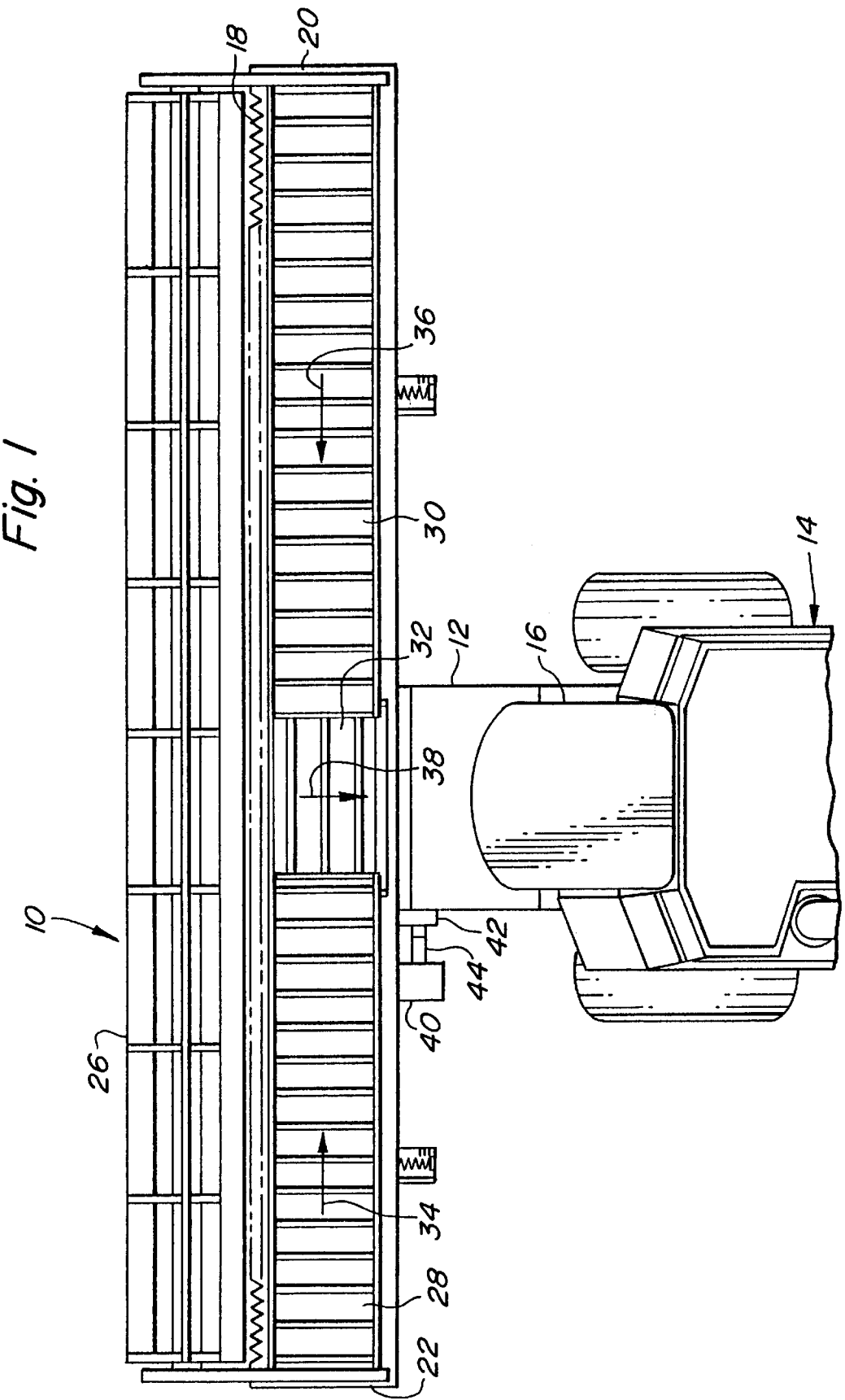
FIG. 1 is a top view of a draper platform containing the hydraulic system of the present invention coupled to a conventional agricultural combine.

The hydraulic system of the present invention is embodied in the draper platform 10 shown in FIG. 1. The platform 10 is attached to the feederhouse 12 of an agricultural combine 14. The combine 14 includes an operator's platform 16 in the form of a cab. The platform 10 includes a cutterbar 18, spaced side sheets 20, 22 and a rear wall 24. A reel 26 rotates above the cutterbar 18 to hold the standing crop against the cutterbar and to move the cut crop material onto the draper belts. The platform 10 is configured with three draper belts, side draper belts 28 and 30 and a center feed draper belt 32. The two side draper belts 28, 30 move crop material laterally toward the center of the platform as shown by the arrows 34, 36 respectively. The center draper belt 32 moves crop material rearward into the feederhouse 12 as shown by the arrow 38.

A platform gearbox 40 is coupled to the feederhouse PTO 42 by a drive shaft 44. The gearbox 40 is coupled by a shaft (not shown) to a drive train for driving the cutterbar 18 in a conventional manner for harvester platforms. The gearbox 40 is also coupled to the belt drive pump 78 shown in the schematic of FIG. 2.

Figure 2:
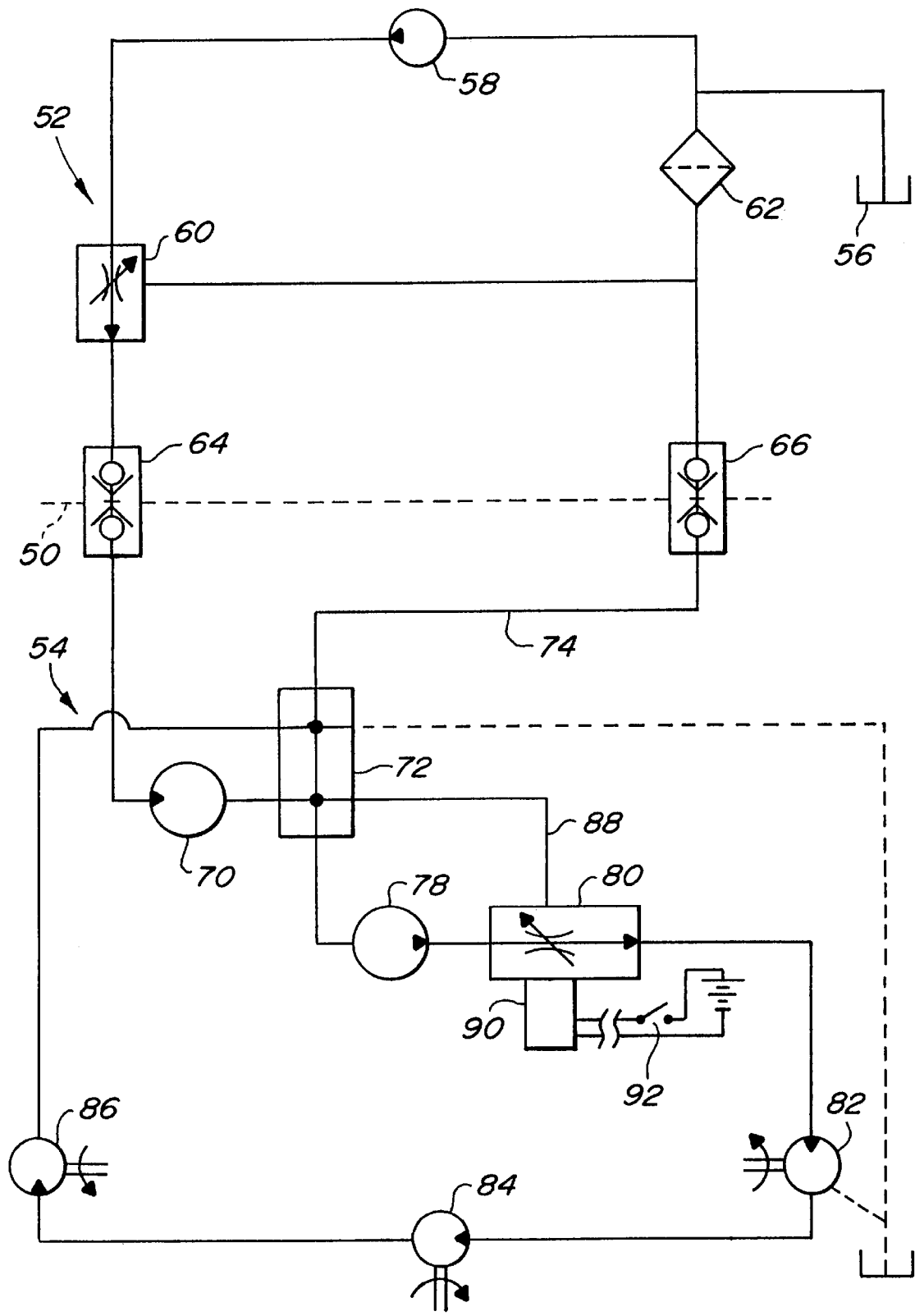
FIG. 2 is a hydraulic schematic showing the hydraulic system of the present invention coupled to the hydraulic system of the combine.

With reference to FIG. 2, the hydraulic system of the present invention for the platform 10, as well as a portion of the hydraulic system of the combine 14 is shown. The combine hydraulic system is shown above the broken line 50 and is designated generally as 52. The platform hydraulic system is shown below the line 50 and designated generally as 54. The combine hydraulic system 52 includes a reservoir 56, a pump 58, variable flow divider 60 and a filter 62. Other components may also be included in the combine hydraulic system. The combine hydraulic system 52 interfaces with the platform hydraulic system 54 through a pair of quick disconnect couplers 64 and 66.

Pressure fluid flows from the combine through the coupler 64 to the reel drive motor 70. In a conventional platform, the reel drive motor return would be directed from the reel drive motor 70, through the coupler 66 and back to the combine. With the hydraulic system 54 the present invention, the oil return from the reel drive motor 70 is directed to a manifold 72. The manifold 72 is in turn connected to the quick disconnect coupler 66 through a line 74.

The inlet of the belt drive pump 78 is also connected to the manifold 72. Fluid from the belt drive pump 78 flows through a variable flow divider 80 and then to three belt drive motors 82, 84, 86, in series. Oil from the belt drive motor 86 is returned to the manifold 72. The platform may have more or less than three draper belts and thus may have more or less than three belt drive motors. The bypass from the variable flow divider 80 is also returned to the manifold 72 by a line 88. The belt drive motor 82 includes a case drain that is also returned to the manifold 72. Depending on the motor pressures, the other motors may also have a case drain that returns to the manifold.

Figure 3:
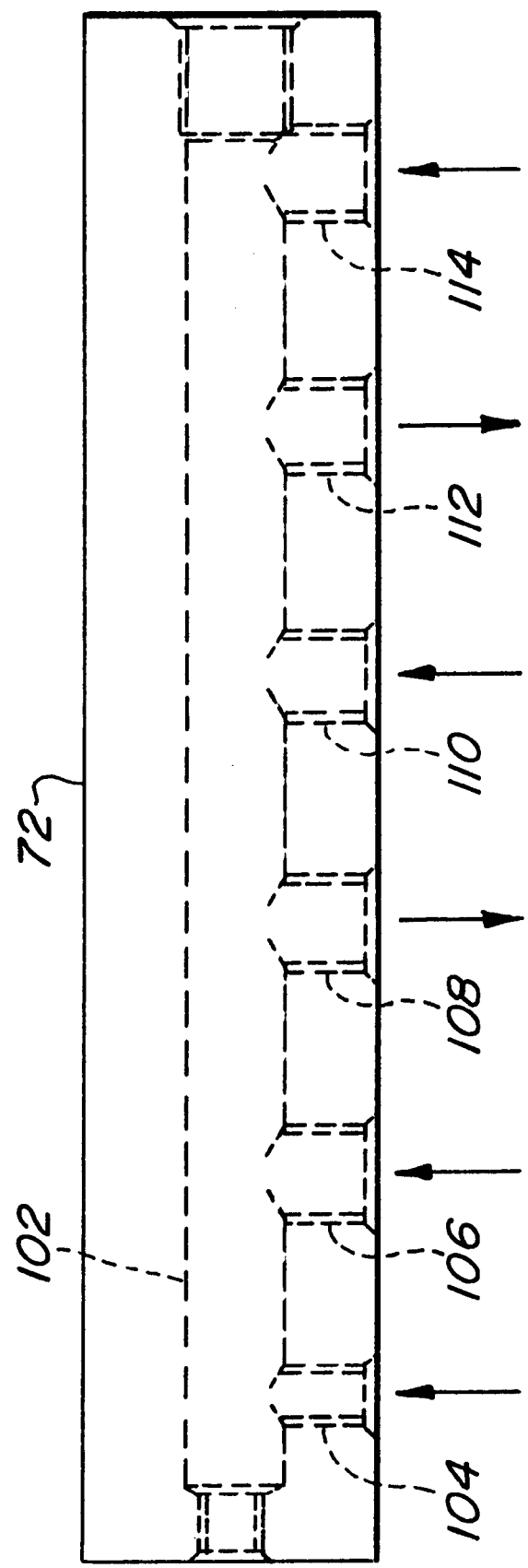
FIG. 3 is a plan view of the manifold utilized in the hydraulic system of the present invention.

The belt drive pump 78 provides increased oil flow to the three belt drive motors 82, 84, 86 to accommodate the requirements of these motors. The sizes of the draper drive motors is determined by the load carried by the draper belts. Depending upon the speed of the reel drive motor 70, regulated by the combine operator through the variable flow divider 60, a greater flow rate through the belt drive motors may be required than is supplied from the reel drive motor. In this case, a portion of the oil will be recirculated from the manifold 72, through the belt drive pump 78 and to the belt drive motors. To reduce the possibility of heat buildup in the platform hydraulic circuit 54, the manifold 72 is configured such that the oil from the reel drive motor 70 is the priority oil drawn by the pump 78. This is accomplished by configuring at the manifold 72 as follows with reference to FIG. 3.

The manifold 72 has a through bore 102 plugged at each end. Six cross bores intersect the through bore 102, forming the six ports in the manifold. Port 104 is the return from the case drain of motor 82. Port 106 is the return from the reel motor 70. Port 108 is an outlet to the pump 78. Port 110 is the return from the third draper belt drive motor 86. Port 112 is the return to the combine hydraulic system 52. Port 114 is the return from the flow divider 80. The reel drive return port 106 and the port 112 to the combine are the only two ports in this manifold that exchange oil with the combine and therefore are the source for fresh cool oil and exhaust for hot oil, respectively. The reel drive return port 106 is located such that it's oil must pass the pump suction port 108 on its way to the combine return port 112. Since oil will take the path of least resistance, it will be drawn into the pump suction instead of returning to the combine.

The flow divider return port 114 is located such that it's oil must pass the combine return port 112 on its way to anywhere. Oil from the third draper belt drive motor 86 will be split between the pump suction and combine, dependent on the reel drive flow rate. This split must balance the conservation of mass into and out of the manifold. Since there will always be oil returning from the reel drive motor 70, this oil must flow past the pump port 108 before reaching the combine return port 112 and will be first to satisfy the pump needs. Only if additional oil is needed for the pump 78 will the return oil from the motor 86 be recirculated.

With reference once again to FIG. 2, the variable flow divider 80 is controlled by an electric actuator 90 in the form of a DC motor. The actuator is controlled by a switch 92 that is preferably located on the operators platform 16 of the combine. This enables adjustment of the draper belt speed by the combine operator without the need to stop the combine and make a manual adjustment of a flow divider located on the platform.

Because of the combine back pressure acting on the belt drive pump 78, it is believed that shaft seal failure is likely to occur with most gear pumps. To avoid this, a motor is used as the pump 78. In a preferred embodiment, an Eaton T-Series Geroler motor is utilized. This motor is not able to draw oil but combine back pressure provides this service. The T-Series motor was selected since its shaft seal can withstand the anticipated back pressure. The pump 78 is powered from the combine PTO through the platform gearbox 40.

The hydraulic system of the present invention utilizes a pump supplied with return oil from the existing reel drive system to provide the necessary oil flow for the three belt drive motors. No modification of the combine hydraulic system is required nor is a complete hydraulic system, including a filter, reservoir and cooling package required on the platform. The pump 78 provides the necessary oil flow to power the belt drive motors. This oil flow may be greater than the oil flow necessary for the reel drive motor 70.

The hydraulic system in the present invention can be utilized in other applications involving detachable implements where two or more hydraulic drive motors are utilized and it is desired to have only a single connection to the hydraulic system of a prime mover. Accordingly, the invention should not be limited to the above-described embodiment, but should be limited solely by the claims that follow.

We claim:

1. A header for a harvester having a hydraulic system, the header comprising:
   a first hydraulic motor having an inlet coupled to the harvester hydraulic system for receiving fluid therefrom, the first hydraulic motor further having an outlet;

a manifold having a plurality of ports including a port coupled to the first hydraulic motor outlet and a port coupled to the harvester hydraulic system for returning fluid thereto;

a pump having an inlet coupled to a port on the manifold for receiving fluid therefrom, the pump further having an outlet; and a second hydraulic motor having an inlet coupled to the pump outlet for receiving fluid therefrom, the second hydraulic motor further having an outlet coupled to a port on the manifold for returning fluid thereto.

2. The header for a harvester as defined by claim 1 further comprising multiple second motors in communication with the pump for receiving fluid therefrom.

3. The header for a harvester as defined by claim 2 wherein the multiple second motors are arranged in series.

4. The header for a harvester as defined by claim 1 further comprising a variable flow divider to vary fluid flow to the second motor and thus vary the speed of the second motor.

5. The header for a harvester as defined by claim 4 wherein excess fluid from the flow divider is returned to the manifold.

6. The header for a harvester as defined by claim 4 further comprising an electric powered actuator to operate the variable flow divider.

7. The header for a harvester as defined by claim 6 further comprising a switch in the harvester for controlling the electric powered actuator for the flow divider whereby adjustment of the second motor speed can be made from the harvester.

8. The header for a harvester as defined by claim 1 wherein the manifold has a port to the pump located between the port for fluid return from the first hydraulic motor and the port for fluid return to the harvester whereby return fluid from the first motor must pass the port to the pump before reaching the return port to the harvester.

9. A header for a harvester having a hydraulic system, the header comprising:

a cutterbar;

a crop conveying draper belt;

a rotatable reel above the cutterbar to control the movement of crop material onto the cutterbar and the draper belt; and a header hydraulic system for driving the reel and the draper belt including:

a reel drive motor having an inlet coupled to the harvester hydraulic system for receiving fluid therefrom, the reel drive motor further having an outlet;

a manifold having a plurality of ports including a port coupled to the reel drive motor outlet and a port coupled to the harvester hydraulic system for returning fluid thereto;

a pump having an inlet coupled to a port on the manifold for receiving fluid therefrom, the pump further having an outlet; and a draper belt drive motor having an inlet coupled to the pump outlet for receiving fluid therefrom, the draper drive motor further having an outlet coupled to a port on the manifold for returning fluid thereto.

10. The header for a harvester as defined by claim 9 further comprising multiple draper belts and multiple draper belt drive motors in communication with the pump for receiving fluid from the pump with fluid from the motors being returned to the manifold.

11. The header for a harvester as defined by claim 10 wherein the multiple draper belt drive motors are arranged in series for receiving fluid from the pump with the last draper drive motor having an outlet coupled to a port on the manifold.

12. The header for a harvester as defined by claim 9 wherein the header hydraulic system further comprises a variable flow divider to vary the speed of the draper drive motor.

13. The header for a harvester as defined by claim 12 further comprising an electric powered actuator to operate the variable flow divider.

14. The header for a harvester as defined by claim 9 wherein the manifold has a port to the pump located between the port for fluid return from the reel drive motor and the port for fluid return to the harvester whereby return fluid from the reel drive motor must pass the port to the pump before reaching the return port to the harvester.

15. A machine system comprising:

a prime mover having a hydraulic system; and an implement attached to the prime mover having an implement hydraulic system comprising:

a first hydraulic motor having an inlet coupled to the prime mover hydraulic system for receiving fluid therefrom, the first hydraulic motor further having an outlet;

a manifold having a plurality of ports including a port coupled to the first hydraulic motor outlet and a port coupled to the prime mover hydraulic system for returning fluid thereto;

a pump having an inlet coupled to a port on the manifold for receiving fluid therefrom, the pump further having an outlet; and a second hydraulic motor having an inlet coupled to the pump outlet for receiving fluid therefrom, the second hydraulic motor further having an outlet coupled to a port on the manifold for returning fluid thereto.

16. The machine system as defined by claim 15 wherein the implement hydraulic system includes multiple second motors in communication with the pump for receiving fluid therefrom.

17. The machine system as defined by claim 15 wherein the implement hydraulic system further comprises a variable flow divider to vary the speed of the second motor.

18. The machine system as defined by claim 17 wherein excess fluid from the flow divider is returned to the manifold.

19. The machine system as defined by claim 17 further comprising an electric powered actuator to operate the variable flow divider.

20. The machine system as defined by claim 19 wherein the prime mover includes an operator's platform and further comprising a switch accessible from the operator's platform for controlling the electric powered actuator for the flow divider whereby adjustment of the second motor speed can be made from the prime mover.

* * * * *